(12) United States Patent
Heckmann

(10) Patent No.: US 7,030,566 B2
(45) Date of Patent: Apr. 18, 2006

(54) CIRCUIT ARRANGEMENT FOR GENERATING AN AC VOLTAGE FROM A DC VOLTAGE

(75) Inventor: Markus Heckmann, München (DE)

(73) Assignee: Patent-Treuhand-Gesellschaft fur Elektrisch Gluhlampen mbH, Munich (DE)

( * ) Notice: Subject to any disclaimer, the term of this patent is extended or adjusted under 35 U.S.C. 154(b) by 0 days.

(21) Appl. No.: 10/935,223

(22) Filed: Sep. 8, 2004

(65) Prior Publication Data

US 2005/0062438 A1    Mar. 24, 2005

(30) Foreign Application Priority Data

Sep. 18, 2003   (DE) ................... 103 43 275

(51) Int. Cl.
*H05B 37/00* (2006.01)

(52) U.S. Cl. .................. 315/209 R; 315/276

(58) Field of Classification Search .......... 315/224, 315/225, 307, 291, 219, 209 R, 244, 276
See application file for complete search history.

(56) References Cited

U.S. PATENT DOCUMENTS

| | | | | |
|---|---|---|---|---|
| 3,922,582 A * | 11/1975 | Pitel | ............................. | 315/106 |
| 4,899,090 A * | 2/1990 | Yoshiike et al. | ............ | 315/335 |
| 4,959,591 A * | 9/1990 | Hirschmann | ............ | 315/209 R |
| 5,563,777 A | 10/1996 | Miki et al. | ...................... | 363/37 |
| 5,677,601 A * | 10/1997 | Zuchtriegel | ............. | 315/209 R |
| 5,898,278 A * | 4/1999 | Muessli | .................. | 315/209 R |
| 6,259,213 B1 * | 7/2001 | Rudolph | .................. | 315/209 R |
| 6,577,077 B1 * | 6/2003 | Hu et al. | ..................... | 315/291 |

* cited by examiner

*Primary Examiner*—Wilson Lee
(74) *Attorney, Agent, or Firm*—Carlo S. Bessone

(57) ABSTRACT

The invention relates to a self-oscillating inverter circuit, preferably having bipolar transistors in a half-bridge circuit, having a transformer as the feedback means. In contrast to the prior art, the secondary windings of the transformer are not connected in parallel with the base-emitter path but in series with the collector-emitter path. As a result, no saturation transformers are required for feedback.

7 Claims, 3 Drawing Sheets

CIRCUIT ARRANGEMENT FOR GENERATING AN AC VOLTAGE FROM A DC VOLTAGE

FIELD OF THE INVENTION

The invention relates to circuit arrangements for generating an AC voltage from a DC voltage. It relates in particular to self-oscillating inverters. The preferred field of application for such inverters is in operating devices for gas discharge lamps.

The generated AC voltage produces an alternating current in a connected load. The incoming DC voltage also provides a direct current. In a similar manner to that which has been mentioned above, the invention thus also relates to circuit arrangements for generating an alternating current from a direct current. Without limiting universality, only the AC voltage and the DC voltage will be described below.

BACKGROUND OF THE INVENTION

Half-bridge and full-bridge circuits are known as a circuit arrangement for generating an AC voltage from a DC voltage, also referred to below as an inverter. Half-bridge circuits are used in particular for operating gas discharge lamps.

The half-bridge contains two series-connected electronic switches which are closed and opened alternately. These switches are driven either from a control circuit or from a connected load circuit. In the latter case, the half-bridge itself drives the electronic switches using feedback means, for which reason a circuit arrangement such as this is referred to as a self-oscillating half-bridge. In the prior art, an inexpensive way of implementing an inverter is to use a self-oscillating half-bridge having bipolar transistors. This eliminates the need for a control circuit and makes it possible to use inexpensive bipolar transistors.

The specification U.S. Pat. No. 5,563,777 (Miki) discloses various embodiments for self-oscillating half-bridges. The feedback means used is a transformer, whose primary side is arranged in the load circuit and whose secondary side drives the electronic switches.

An electronic switch generally has two make contacts and a control contact. A load resistor may be defined between the make contacts, and a control resistor may be defined between a make contact and the control contact. In the case of a bipolar transistor in a half-bridge, the emitter and the collector form the make contacts, and the base forms the control contact. The control resistor is positioned between the base and the emitter. In the case of a MOSFET in a half-bridge, the source and the drain form the make contacts, and the gate forms the control contact. The control resistor is positioned between the gate and the source.

The specification U.S. Pat. No. 5,563,777 (Miki) shows a number of exemplary embodiments for the transformer. Firstly, the transformer may be in the form of a separate transformer which acts only as the feedback means. This transformer may be either saturated or unsaturated. Secondly, the transformer may be formed from an inductor in the load circuit, to which the secondary windings are applied. The inductor in the load circuit then forms the primary winding of the transformer. In applications for operating gas discharge lamps, this inductor may be used as the so-called lamp inductor. In other applications, it may be used, for example, to make near-resonance operation possible. As is also the case for the separate transformer mentioned above, the transformer which comprises the inductor may be saturated or unsaturated in design.

All of the embodiments known from the prior art have secondary windings which are connected in parallel with the control resistor.

The embodiments from the prior art have the following disadvantages: Embodiments with an unsaturated transformer sometimes have high switching losses since closing of the electronic switches is not always ensured when no voltage is applied. There are also sometimes high driving losses since the base currents of the electronic switches may be high in value.

Embodiments having a saturated transformer have high transformer losses owing to its high drive level. In addition, the saturation properties are subject to high manufacturing tolerances. This means that a complex selection process is required when selecting the mass-produced transformer.

SUMMARY OF THE INVENTION

It is the object of the present invention to provide a circuit arrangement for generating an AC voltage from a DC voltage which provides for self-oscillation using a transformer cost-effectively and with low losses. A cost-effective solution is also considered to be one in which no components are required which entail high tolerances.

This object is achieved by a circuit arrangement for generating an AC voltage from a DC voltage, which has, as the feedback means, a transformer having at least one secondary winding which is connected in series with a load resistor of an electronic switch.

The control contact is connected such that the control resistor of the electronic switch and the secondary winding are in a mesh.

The secondary winding is not connected in parallel with the control resistor as in the prior art. Rather, the electronic switch is driven by altering the voltage level of a make contact. In the time intervals in which the electronic switch is closed, a load current flows through the secondary winding. The load current thus also has an effect on the driving of the electronic switch.

In the case of a half-bridge, an electronic switch is only closed when a dead time has elapsed once the other electronic switch has opened. It is generally known that this results in switching load relief of the electronic switches. It is not always ensured that the dead time has the optimum length in all operating states of the inverter, such as load shedding, short circuit, overload, overvoltage or undervoltage, for example. A non-optimum dead time can result in current peaks in the electronic switches and in the electronic switches being damaged. The drive circuit according to the invention for the electronic switches has a component having an inductive effect which is connected in series with the load resistor. When current peaks occur in the electronic switch, the drive circuit according to the invention advantageously reduces the level of these current peaks.

The circuit arrangement according to the invention forms a self-oscillating inverter which makes possible low driving and switching losses for electronic switches without using a saturated transformer.

BRIEF DESCRIPTION OF THE DRAWINGS

The invention will be explained in more detail below using exemplary embodiments with reference to drawings, in which.

Figure 1:
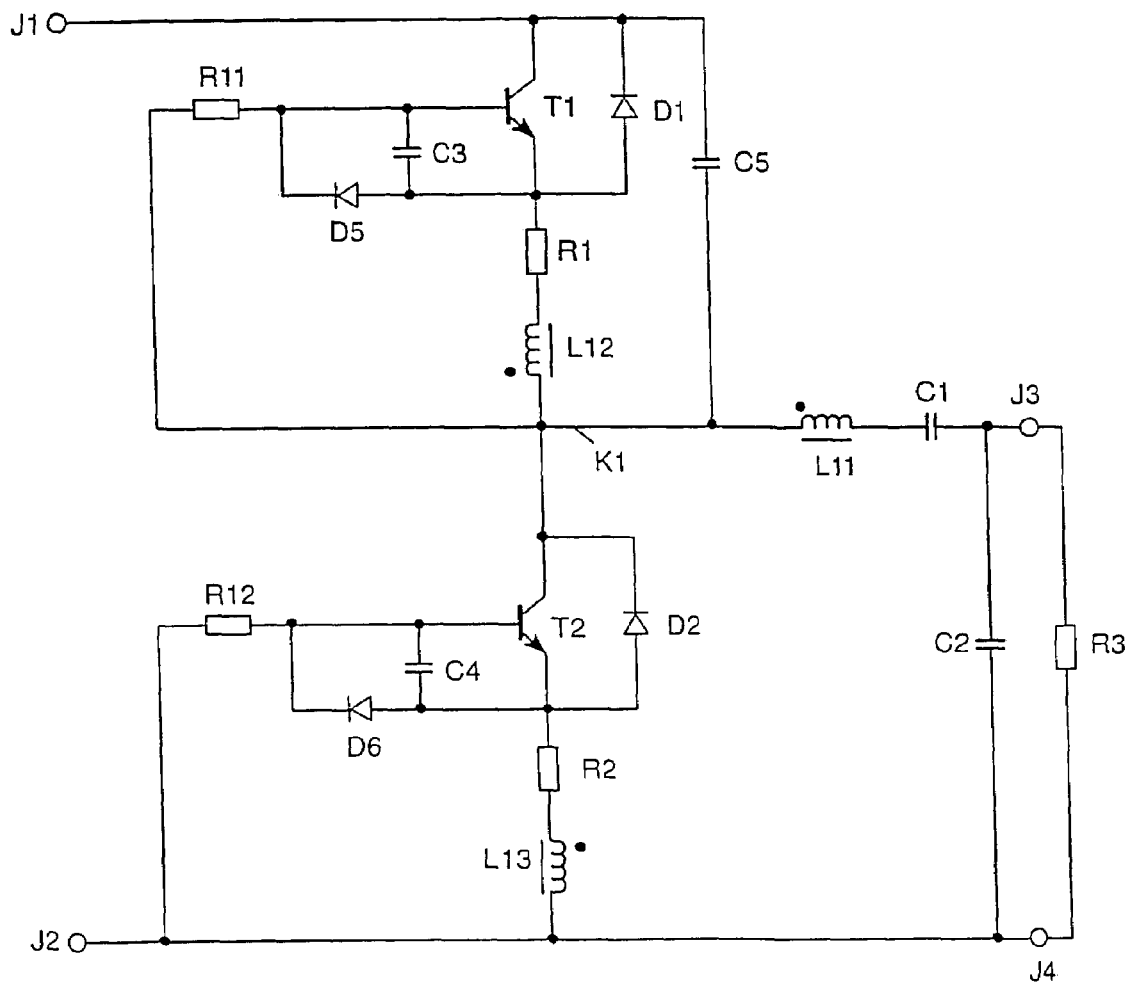
FIG. 1 shows an exemplary embodiment of a circuit arrangement according to the invention.

In the text which follows, resistors are referred to by the letter R, capacitors by the letter C, transistors by the letter T, diodes by the letter D and junctions by the letter J, in each case followed by a number. Also, in the text which follows the same reference numerals are used throughout for the same elements and for elements having the same functions in the various exemplary embodiments.

DETAILED DESCRIPTION OF THE INVENTION

FIG. 1 shows an exemplary embodiment of an inverter according to the invention.

A DC voltage source may be connected to a first and a second DC voltage input J1 and J2. In the present example, a positive pole of the DC voltage source must be connected to J1, and a negative pole must be connected to J2.

A first series arrangement forms the series circuit comprising a first electronic switch T1, a resistor R1 and a first secondary winding L12.

A second series arrangement forms the series circuit comprising a second electronic switch T2, a resistor R2 and a second secondary winding L13.

The two series arrangements are connected in series and are connected between the DC voltage inputs J1 and J2. The two series arrangements thus form a half-bridge. There is an AC voltage output K1 at the connecting point of the two series arrangements. By alternately closing the electronic switches, the potential of the AC voltage output K1 is alternately at the potential of J1 and J2.

For cost reasons, the electronic switches are preferably in the form of NPN bipolar transistors. However, other electronic switches, such as PNP bipolar transistors, MOSFETs or IGBTs are also possible.

The resistors R1 and R2 each provide negative feedback for T1 and T2 with a generally known effect. It is also possible not to use the resistors and for them to be replaced by a short circuit.

An important factor in the operation according to the invention of the secondary windings L12 and L13 is their arrangement with respect to the terminals of the electronic switches. In the exemplary embodiment shown in FIG. 1, the secondary winding L12 is connected to the emitter of T1 via the resistor R1. The secondary winding L12 is thus connected in series with the load resistor of T1. This series circuit comprising the load resistor of T1 and the secondary winding L12 is connected between the DC voltage input J1 and the AC voltage output K1. In addition, in the exemplary embodiment shown in FIG. 1, the secondary winding L13 is connected to the emitter of T2 via the resistor R2. The secondary winding L13 is thus connected in series with the load resistor of T2. This series circuit comprising the load resistor of T2 and the secondary winding L13 is connected between the DC voltage input J2 and the AC voltage output K1.

In each case a generally known freewheeling diode D1 and D2 is connected in parallel with the load resistors of T1 and T2. These diodes may also be integrated in the electronic switch or may be dispensed with entirely.

A so-called snubber capacitor C5 is connected between the AC voltage output K1 and the DC voltage input J1. It reduces the flank gradient of the voltage at the AC voltage output K1. C5 may also be connected to J2.

In order for the electronic switches to be effectively driven by the secondary windings L12 and L13, the respective control contact is connected such that the respective control resistor and the respective secondary winding are in a mesh. For this purpose, the base of T1 is connected to the AC voltage output K1 via a resistor R11, and the base of T2 is connected to the DC voltage input J2 via a resistor R12.

In each case a diode D5, D6 and a capacitor C3, C4 is connected in parallel with the control resistors of T1 and T2. The diodes D5, D6 and the capacitors C3, C4 are not necessarily required for implementing the invention. They serve the purpose of optimizing the driving of the electronic switches T1, T2.

The circuit arrangement has two load outputs J3 and J4 to which a load may be connected. The potential at J4 may be understood as being the reference potential. J4 is connected to the DC voltage input J2. It is also possible to connect J4 to J1 or to create a desired reference potential by means of a voltage divider, J4 being connected to said reference potential.

A reactance network is connected between the AC voltage output K1 and the load outputs J3, J4 and transforms the impedance at the AC voltage output K1 to the load outputs. It comprises the primary winding L11 and the capacitors C1 and C2. The primary winding L11 and the capacitor C1 are connected in series and are connected between the AC voltage output K1 and the load output J3. The capacitor C2 is connected between the load outputs J3 and J4.

The primary winding L11 is coupled to the secondary windings L12 and L13. The primary winding L11 and the secondary windings L12 and L13 thus form a transformer. The respective winding direction of the transformer windings is indicated by dots in a known manner. The primary winding L11 is coupled at a first terminal to the AC voltage output K1 and at a second terminal to the load output J3. A load current thus flows through the primary winding L1.

Representatively for any desired loads, a load resistor R3 is connected to the load outputs J3 and J4. The reactance network may be modified in any desired manner. As described above, a load current only needs to flow through the primary winding. The reactance network illustrated in FIG. 1 is preferably used for the case in which one or more gas discharge lamps are connected for R3. In this case, C1 forms a block capacitor which prevents the voltage between the load outputs J3 and J4 from having a DC voltage component. The primary winding L11 in this case takes on the function of a lamp inductor and forms, together with C2, a series resonant circuit.

It is also possible for a load to be coupled to the transformer via a further winding. This may also be a halogen incandescent lamp.

The half-bridge may also be extended to form a full-bridge. The primary winding is in this case connected in the bridge branch. In addition, the transformer in this case has two further secondary windings for driving the two further electronic switches in an equivalent manner.

Figure 2:
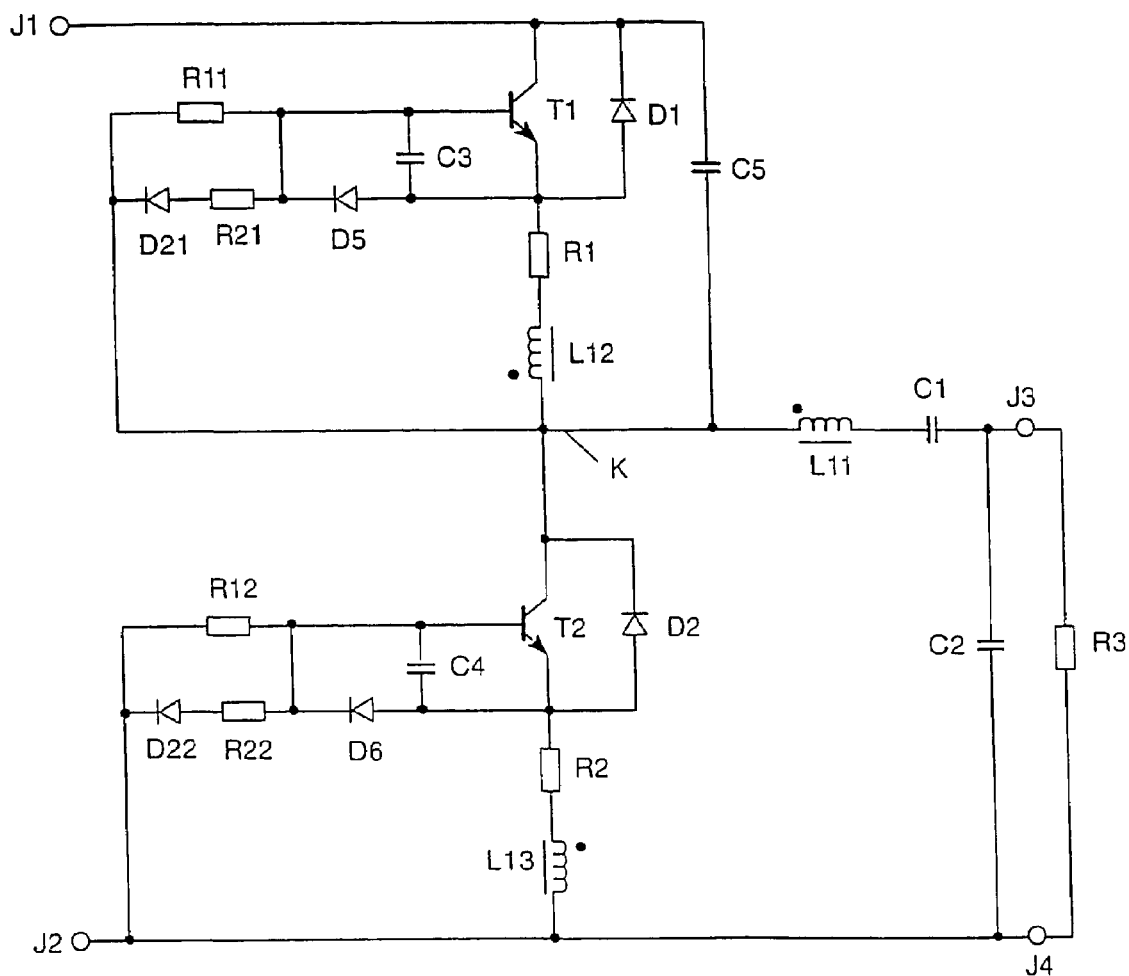
FIG. 2 shows an exemplary embodiment following on from FIG. 1 with an improved drive circuit for the electronic switches.

FIG. 2 shows a further exemplary embodiment of an inverter according to the invention. As compared with FIG. 1, in FIG. 2, in each case respectively, the series circuit comprising a resistor R21 or R22 and a diode D21 or D22 is connected in parallel with the resistors R11 and R12. The opening of the electronic switches T1 or T2 is thus improved.

Figure 3:
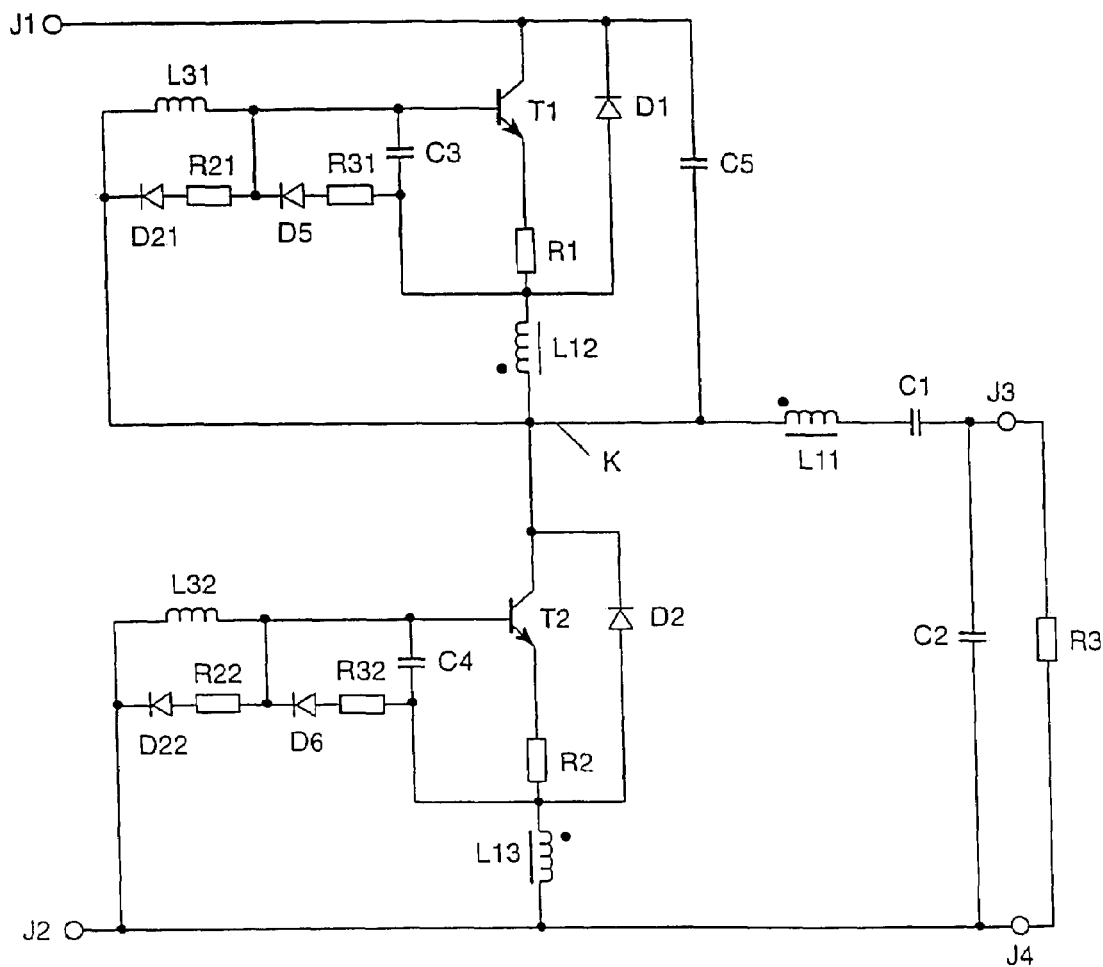
FIG. 3 shows an exemplary embodiment following on from FIG. 1 with a further improved drive circuit for the electronic switches.

FIG. 3 shows a further exemplary embodiment of an inverter according to the invention. As compared with FIG. 2, the resistors R11 and R22 are each replaced by an inductor L31 and L32, respectively. As a result, in each case respectively, the series circuit comprising a diode D21 or D22 and a resistor R21 or R22 is connected in parallel with the inductors L31 or L32. Furthermore, a resistor R31 and R32 is connected in series with each of the diodes D5 and D6. The changes made to the circuit in FIG. 3 as compared with that in FIG. 2 further improve the closing and opening of T1 and T2. Primarily, as a result of this, switching losses are reduced and switching times with respect to the resonance properties of a load circuit comprising a reactance network and load are optimized. At a low resonant frequency of the inverter, for example 30 Hz, it has been shown that the use of Schottky diodes for D5 and D6 and the short-circuiting of the resistors R31 and R32 have an advantageous effect on the power loss of the inverter.

As compared with FIG. 2, FIG. 3 has the following further change: The capacitor C3 and the diode D1 are not connected directly to the emitter of T1 as in FIG. 2 but are connected to the connecting point of R1 and the secondary winding L12. In a corresponding manner, the connection of the capacitor C4 and the diode D2 is also different. As a result, the so-called freewheeling current no longer flows via the resistor R1 or R2, which improves the efficiency of the circuit arrangement. In addition, this change improves the switching behaviour of the electronic switches T1, T2.

The dimensions specified below for the major components in FIG. 3 make it possible to operate two 36 watt fluorescent lamps at a voltage at the DC voltage inputs J1, J2 of 230 V:

Transformer core: EVD 25
L11: 128 turns
L12: 4 turns
L13: 4 turns
C2: 12 nF
R1, R2: 1 ohm
L31, L32: 1 mH
R21, R22: 39 ohm
R31, R32: 4.7 ohm A resonant frequency of the inverter of approximately 50 kHz results. When using bipolar transistors, operation in the frequency range of between 20 kHz and 100 kHz is advantageous.

A circuit arrangement according to the invention is preferably used in an electronic operating device for operating fluorescent lamps. In addition to the circuit arrangement according to the invention, such an operating device contains means for providing a DC voltage from a system AC voltage. These means may also contain means for reducing the system current harmonics. Furthermore, such an operating device may contain means for regulating operating parameters. In addition, such an operating device may contain means for disconnecting the operating device in abnormal operating states. In addition, an operating device such as this may contain means which are suitable for suppressing radio interference.

The invention claimed is:

1. A circuit arrangement for generating an AC voltage having the following features:
   a first and a second DC voltage input (J1, J2), for connection to a DC voltage source,
   at least one AC voltage output (K1),
   at least one load output (J3, J4), for connection to a load,
   at least one electronic switch (T1, T2) having two make contacts and a control contact, as a result of which a load resistor is defined between the make contacts, and a control resistor is defined between the control contact and a make contact,
   a make contact is coupled to a DC voltage input (J1, J2), and the other make contact is coupled to the AC voltage output (K1),
   a transformer having a primary (L11) and at least one secondary winding (L12, L13), a first terminal of the primary winding being coupled to the AC voltage output (K1), and a second terminal of the primary winding being coupled to the load output (J3), characterized in that the circuit arrangement has the following features:
   the secondary winding (L12, L13) and the load resistor form a series circuit which is connected between a DC voltage input (J1, J2) and the AC voltage output (K1),
   the control contact is connected such that the control resistor and the secondary winding (L12, L13) are in a mesh.

2. The circuit arrangement as claimed in claim 1, characterized in that the circuit arrangement contains two electronic switches (T1, T2), which are arranged in a half-bridge circuit.

3. The circuit arrangement as claimed in claim 1, characterized in that the electronic switches (T1, T2) are in the form of bipolar transistors.

4. The circuit arrangement as claimed in claim 2, characterized in that the load resistors of the two electronic switches (T1, T2) are each connected in series with a secondary winding (L12, L13).

5. The circuit arrangement as claimed in claim 4, characterized in that the control resistors of the electronic switches (T1, T2) and the secondary windings (L12, L13) are each connected via an inductor (L31, L32) to form a mesh.

6. The circuit arrangement as claimed in claim 5, characterized in that in each case the series circuit comprising a diode (D21, D22) and a resistor (R21, R22) is connected in parallel with the inductors (L31, L32).

7. An operating device for operating fluorescent lamps, characterized in that the operating device comprises a circuit arrangement as claimed in claim 1.

* * * * *